Patented Aug. 8, 1939

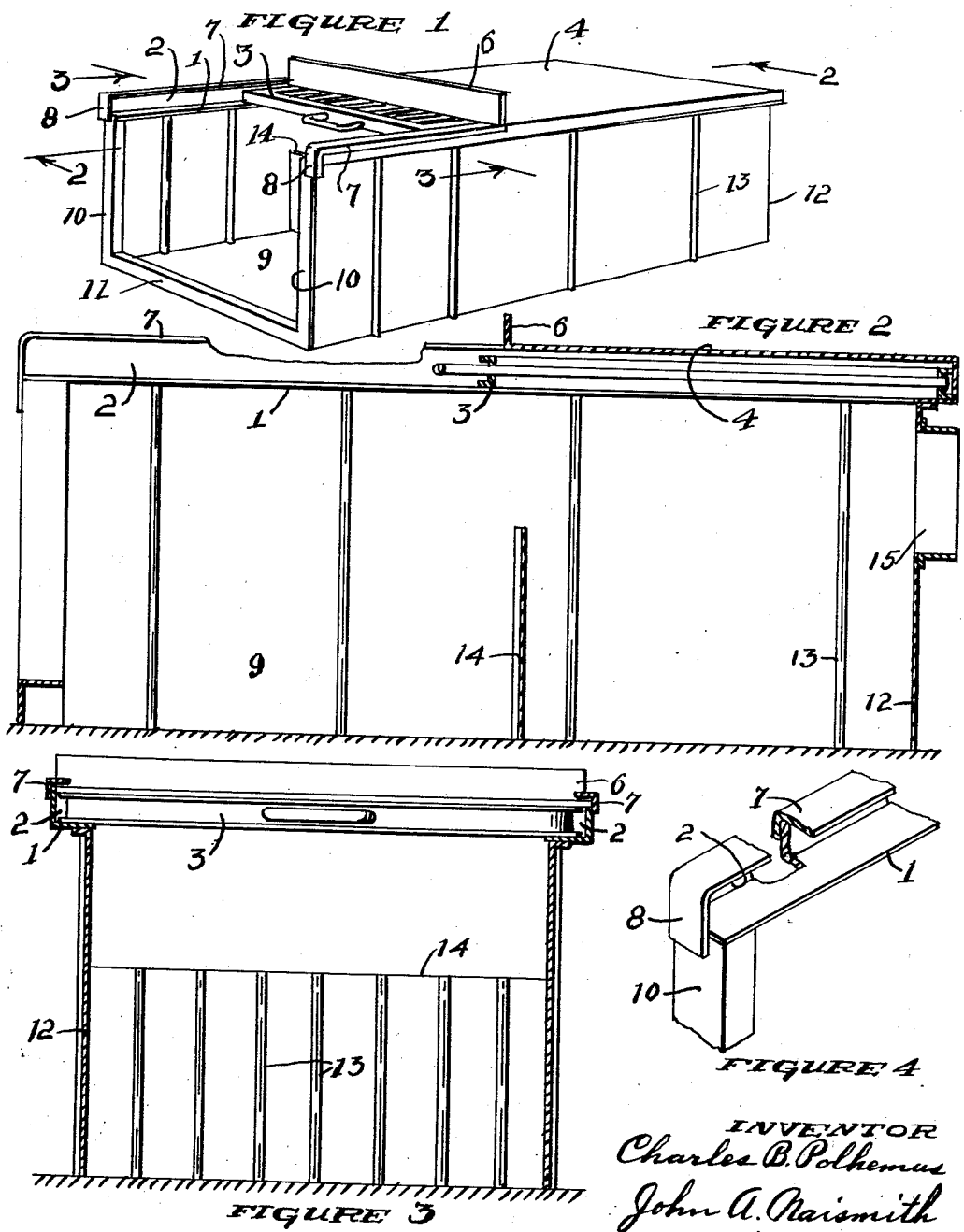

2,168,944

UNITED STATES PATENT OFFICE 2,168,944

BARBECUE STOVE

Charles B. Polhemus, San Jose, Calif.

Application June 21, 1937, Serial No. 149,317

3 Claims. (Cl. 126—29)

The present invention relates particularly to a stationary barbecue designed for use in the yard, in public parks, and similar places.

It is one object of the present invention to provide a barbecue of the character indicated that will be useful, not only as a barbecue, but also as a suitable enclosure for a camp fire and as a hot plate.

It is another object of the invention to provide a structure of the character indicated so constructed and arranged that any desired type of enclosing wall may be used without modification of the barbecue unit.

It is also an object to provide a barbecue unit wherein the grill may be quickly and easily moved under a protective covering when not in use, and as quickly and easily moved into position for use.

It is still another object to provide a barbecue of the character indicated provided with a hot plate available for use at all times when a fire is burning therein and that will function as a covering for the grill without loss of efficiency.

Finally, it is an object of the invention to provide a barbecue of the character indicated that will be simple in form and construction, that has no moving parts other than the grill, that will be economical to manufacture, strong and durable, and highly efficient in its practical application.

In the drawing:

Figure 1 is a perspective view of a barbecue embodying my invention.

Figure 2 is a sectional view on line 2—2 of Figure 1, a part being broken away.

Figure 3 is a sectional view on line 3—3 of Figure 1.

Figure 4 is a perspective view of a portion of one side of the barbecue frame showing the grill slide and stop.

In the particular embodiment of the invention herein disclosed I show at 1 an angle iron bent into a U shape and disposed in a horizontal plane to form the bottom and sides of a grill guide 2. This member 1 is substantially twice as long as the grill 3 and has a plate 4, having an area substantially equal to that of the grill, 5, mounted on the rear portion of its upper edge. The plate functions as a cover for the grill 5 when the grill is pushed back under the same, and as a hot-plate whenever a fire is built in the barbecue. An upturned flange 6 on the front end of the plate 4 serves to protect utensils thereon from the fire which is built forwardly thereof.

The plate 4 forms a top for the guide 2 throughout its rear half, but angle irons as 7—7 are mounted on the forward ends of the part 1 to overlie the forward ends of the guide as shown. The front ends of these irons 7—7 are turned down as at 8—8 to form stops for the grill 3. By means of this construction the grill 3 may slide freely into a completely uncovered position over the front portion of the barbecue where the fire is built, as at 9, or into a completely covered position under the plate 4 as described. Since the parts 8—8 are securely and permanently fastened in the position shown the grill 5 cannot be removed without mutilation of its supporting frame.

The front end of the barbecue comprises an upright angle iron on each corner as at 10—10, and a bottom connecting angle iron 11, all formed integrally with the part 1. This construction is such that when the grill 3 is shoved back under plate 4 the front of the barbecue is left entirely open with no cross bars or other members to interfere with the view of the fire, or to interfere with its care.

In the present case the two sides and the rear of the barbecue are enclosed by a single sheet of sheet metal 12 mounted thereon and strengthened by ribs as at 13. At 14 is a low sheet-metal wall disposed crosswise of the barbecue and slightly back of flange 6 and in a plane parallel thereto, and a smoke outlet is formed at 15 in the back of the barbecue and with its lower edge slightly below the top of part 14 and its upper edge adjacent plate 4.

When a fire is built in the part 9 a draft is created that carries the products of combustion backwardly over the top edge of wall 14, thence immediately below the plate 4 to heat the same, and then out through the outlet 15. When the grill 5 is pulled forwardly over the fire section 9 it functions in the usual manner but the smoke is drawn away therefrom as above described. When not in use the grill is pushed back under the plate 4 and is then protected from the elements but does not interfere with the heating of the plate.

While the framework of the grill is here shown as enclosed on two sides and the back with a sheet-metal wall, this wall may be omitted entirely, and brick, stone, earth, concrete, or any other suitable material may be substituted therefor. The arrangement of the U shaped member 1 and the front parts 10 and 11 is such that the structure may be made and delivered as a top and front only, the purchaser providing the setting and building up the two sides and the rear as desired and according to the material available.

It is to be understood, of course, that while I have herein shown and described but one specific embodiment of the invention, changes in form, construction, and method of assembly and operation may be made within the scope of the appended claims.

I claim:

1. A barbecue stove comprising, a U shaped channel member forming a guide for a grill and disposed to lie in a horizontal plane with its open end directed forwardly, supporting members depending from the forward ends of the channel member, a grill having a length equal to substantially one-half the length of the U shaped member slidably mounted in the guide, and a cover plate mounted on one-half the U shaped member to overlie the grill when the grill is moved to one end of the guide.

2. A barbecue stove comprising, a U shaped channel member forming a guide for a grill, a grill slidably mounted in the guide, a cover plate mounted on the channel member to overlie the grill when the grill is moved to one end of the guide, a wall structure to support the channel member, a smoke outlet leading through the wall beneath the plate, and a cross wall connecting said supporting wall structure in spaced relation to the plate and adjacent its free edge.

3. In a barbecue stove, in combination, a channel member bent into a U shape to form the bottom and sides of a grill guide, a cover plate mounted on the closed end of the U shaped member to cooperate therewith to form a pocket to receive a grill, angle irons mounted on the forward portions of the U shaped member to cooperate therewith to complete the guide for a grill, and a grill slidably mounted in the guide, and supporting structure for the U shaped member.

CHARLES B. POLHEMUS.